Jan. 20, 1953      R. H. LOWE      2,625,832

MECHANISM FOR USE IN STOCK FEEDING DEVICES

Filed Dec. 2, 1948      2 SHEETS—SHEET 1

INVENTOR.
Ralph H. Lowe
BY Dybvig & Dybvig
HIS ATTORNEYS

Jan. 20, 1953 R. H. LOWE 2,625,832
MECHANISM FOR USE IN STOCK FEEDING DEVICES
Filed Dec. 2, 1948 2 SHEETS—SHEET 2

INVENTOR.
Ralph H. Lowe
BY Dybvig & Dybvig
HIS ATTORNEYS

Patented Jan. 20, 1953

2,625,832

UNITED STATES PATENT OFFICE 2,625,832

MECHANISM FOR USE IN STOCK FEEDING DEVICES

Ralph H. Lowe, Dayton, Ohio

Application December 2, 1948, Serial No. 63,087

3 Claims. (Cl. 74—424.8)

1

This invention relates to a mechanism for use in a stock feeding device for feeding stock with respect to a cutting tool.

Certain types of cutting tools, as for example, cutting tools provided with an inclined face terminating in an edge portion in a plane substantially parallel to the longitudinal axis of the cutting tool present difficulty in sharpening after the cutting edge gets dull.

An object of this invention is to provide a cutter that is cylindrical and terminates in one or more helical surfaces in the end thereof and is provided with a chip relief passage, one edge of the chip relief passage cooperating with the helical surface to form a cutting edge, so that as the cutting edge is dulled, it is merely necessary to refinish or grind the straight side of the relief passage to put the tool into sharpened condition, thereby simplifying the mode of sharpening the tool and thereby utilizing the material from which the tool is made to the greatest advantage.

Another object of this invention is to provide an apparatus and a method of manufacturing the cutting tool described above, which apparatus advances the work stock from which the cutting tool is made progressively during a portion of a revolution, then retracting the work stock so as to repeat the operation until the helical end surface has been produced on the end of the stock, the stock-retracting movement taking place while the cutter passes over the chip relief passage.

Another object of this invention is to provide a device for advancing the stock gradually for a portion of a revolution and then rapidly retracting the stock during another portion of the revolution in readiness for another stock-advancing movement.

Other objects and advantages reside in the construction of parts, the combination thereof and the mode of operation, as will become more apparent from the following description.

In the drawings, Figure 1 is a perspective view of my new cutting tool.

Figure 7:
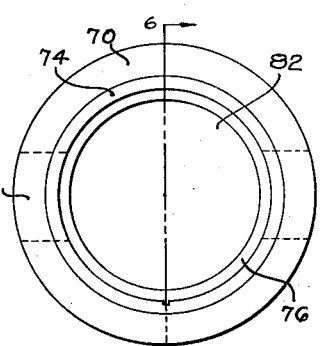

2 of the outer stationary member of the stock feeding device, taken substantially on the line 6—6 of Figure 7.

Figure 6:
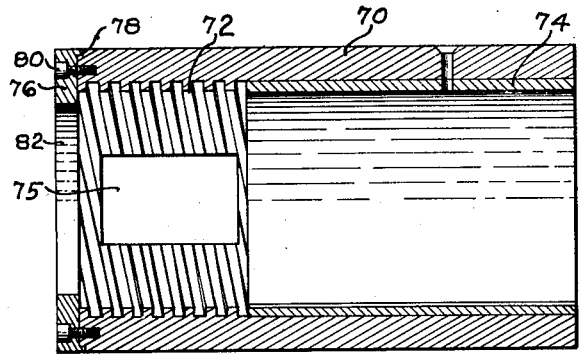
Figure 6 is a longitudinal cross sectional view

Figure 7 is an end elevational view, as viewed from the right of Figure 6.

Figure 8:
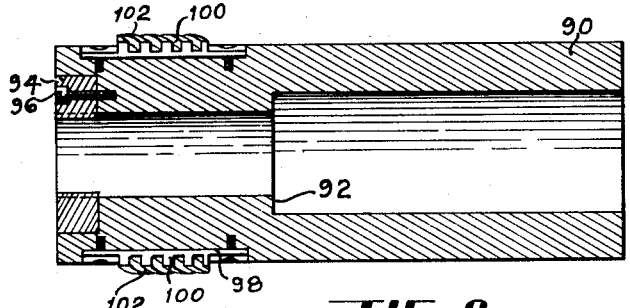
Figure 9:
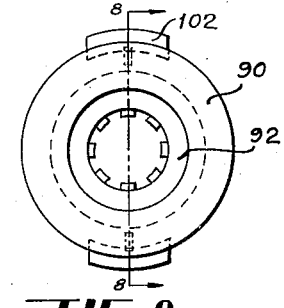

Figure 8 is a longitudinal cross sectional view, taken substantially on the line 8—8 of Figure 9, showing the inner stock feeding member.

Figure 9 is an end elevational view of the inner feeding member, as viewed from the right of Figure 8.

Figure 10:
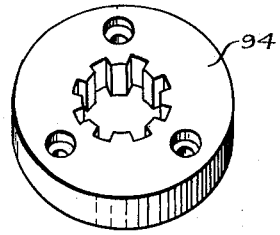

Figure 10 is an end elevational view of the splined collar attached to the left end of the inner feeding member disclosed in Figure 8.

Figure 11:
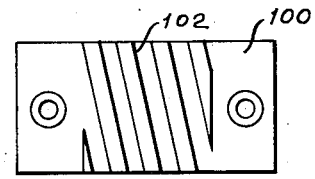

Figure 11 is a top plan view of the thread plate.

Figure 12:

Figure 12 is an end elevational view thereof.

Figure 13:
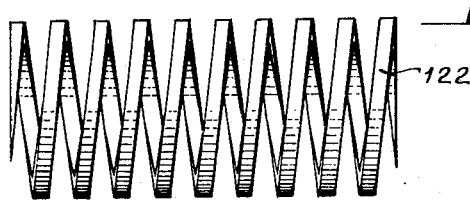

Figure 13 is a side elevational view of a helical compression spring used in retracting the tool.

Figures 14, 15:
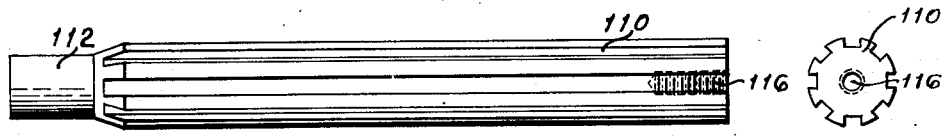

Figure 14 is a side elevational view of a splined shaft used in driving the inner stock feeding member.

Figure 15 is an end elevational view of the splined shaft.

Referring to the drawings, the reference character 20 has been used to designate a tool that may be used for various purposes, as for example, a tool for boring, facing, co-boring and other cutting purposes.

In the particular embodiment shown, the tool has two helical faces 22 and two chip relief passages 24. The chip relief passages are diametrically disposed. The chip relief passages are bounded by a pair of walls 26 and 28 that may be parallel or angularly disposed as disclosed. These chip relief passages terminate in the center in a suitable aperture 30 that may be used for a lead or a drill or any other suitable centrally disposed tool. This tool has not been shown for the reason that any suitable tool may be used. The tool is held in position by a suitable set screw 32 located in an aperture extending radially from the center of the tool and provided with threads so as to permit the set screw to hold the centrally disposed tool in position.

In the particular modification disclosed, the outer margins 34 of each helical portion are bevelled. Furthermore, a V-groove 36 extends along the center of the helical surface. The shape of the helical surface may be as shown, or any other suitable contour needed to meet the requirements. In sharpening the tool, it is merely necessary to grind or sharpen the face of the side wall 28, in other words, cut it back, so as to provide a sharp edge 40. It can readily be seen that by this arrangement the tool can be sharpened until the entire helical surface has been utilized. In the particular embodiment disclosed herein, two helical surfaces have been shown. Instead of two, the tool could be provided with one helical surface or any multiple thereof. The tool is provided with a shank 42 that has a diameter suitable to meet the requirements of the chuck in which the tool is secured for use.

In order to produce the helical face upon the cutting tool, a stock feeding device for use on a lathe has been developed, which will now be described. The lathe 50 may be any conventional lathe provided with a conventional head stock 52 and a saddle 56. The saddle 56 supports any suitable cutting tool 58. Fixedly mounted upon the bed of the lathe is a suitable frame 60, fixedly supporting a tubular housing 70. One end of the housing 70 has been provided with threads 72. A bushing or bearing 74 is mounted in the opposite end of the housing and extends from the threads 72 to the end of the housing. The housing is provided with a pair of diametrically disposed openings 75, rectangular in shape. A hollow capping member 76, provided with an annular rim or flange 78, is secured to the end of the housing 70 by a plurality of screws 80. The opening 82 in the end of the capping member has a diameter somewhat smaller than the internal diameter of the threads, so as to provide a seat for the stock feeding mechanism which will now be described.

A tubular member 90 provided with an internal shoulder 92 is journalled in the bushing 74. The tubular member 90 has fixedly attached to one end thereof a splined capping member 94 held in position by suitable screws 96. Member 90 is provided with a pair of cut-away rectangular recesses 98, in which are seated threaded plate members 100 secured in position by suitable screws or bolts. The thread segments 102 on the threaded plate members 100 engage the threads 72 of the housing 70. A splined shaft 110 extends into the splined capping member or collar 94. The splined shaft 110 is preferably provided with a reduced shank 112, adapted to be fixedly mounted in a universal joint 114 connected in any suitable manner to a chuck in the head stock 52, so that as the chuck is rotated, the shaft 110 is rotated, thereby rotating the tubular member 90 within the fixed outer housing member 70. The end of the shaft 110 is provided with a threaded aperture 116, receiving a bolt 118, securing a washer 120 in position. A compression spring 122 surrounds the splined shaft and has one end seated against the shoulder 92 in tubular member 90 and the other end abutting the washer 120. This causes the spring 122 to urge the tubular member 90 into engagement with the seat formed by the face plate or hollow capping member 76. However, as the tubular member 90 is rotated within the housing member 70, the direction of rotation is such that the thread segments 102 on the threaded plate member 100 force tubular member 90 outwardly and away from the bottom of the housing member 70 until the thread segments 102 disengage the threads 72 by advancing into the slots or openings 75.

Figures 1, 2, 3:
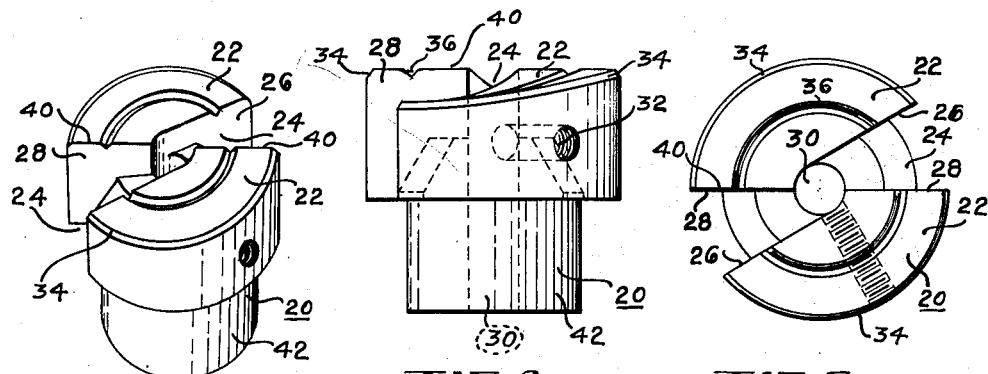
Figure 2 is a side elevational view of the cutting tool.
Figure 3 is a front end view of the cutting tool.
Figure 4:
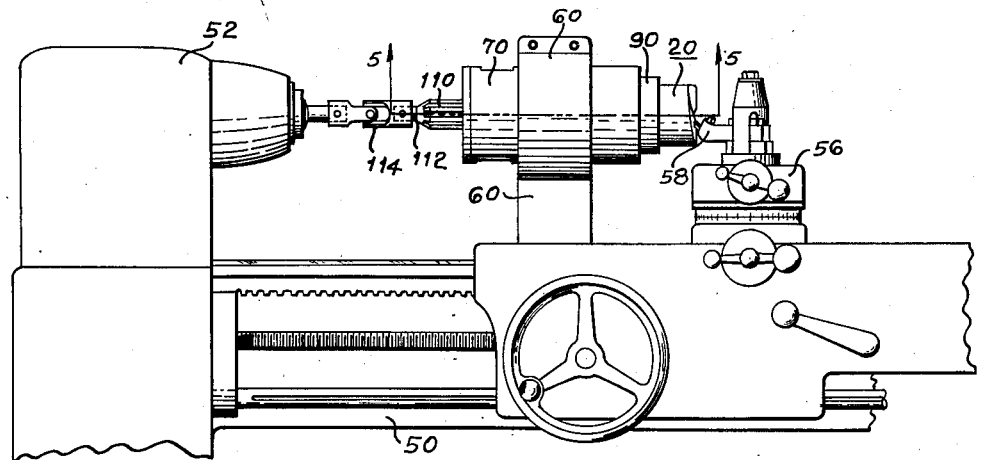
Figure 4 is a side elevational view of a lathe having the stock feeding device attached thereto, which stock is used in forming the tool disclosed in Figures 1, 2 and 3.
Figure 5:
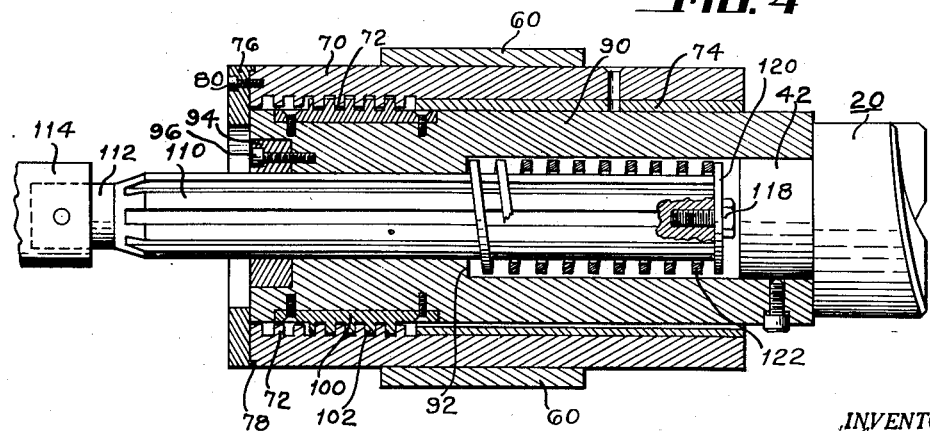
Figure 5 is a longitudinal cross sectional view of the stock feeding device, taken substantially on the line 5—5 of Figure 4.

As soon as the thread segments 102 are positioned in the slots 75, it can be readily seen that the compression spring 122 will snap tubular member 90 to the left, so as to be seated upon a seat formed by the face plate 76. In other words, tubular member 90 is moved outwardly through less than one-half of a revolution when two faces are being made upon the cutting tool, then snapped into position and the operation repeated as the tubular member 90 rotates. The cutting tool 58 will then form a helical cut in the end of the stock. However, before the stock is placed in position, two chip cut-away grooves are first formed in the stock. After these chip escape grooves have been formed or cut, the stock is mounted in the end of the tubular member 90 and secured in position by a suitable set screw, or in any other suitable manner, so as to be held in the end of member 90, as shown in Figure 4. By actuating the saddle 56 away from and towards the center of rotation of the stock, it can readily be seen that the helical face will be cut on the end of the stock, as is well known to those skilled in the art of the operation of lathes.

After the helical faces have been cut on the cutting tool, another tool is mounted in the saddle 56 for bevelling the edges and for forming the V-shaped groove, or for producing any other desirable contour in the faces of the cutting tool. It may be found desirable to grind the surfaces or lap the surfaces, as the case may be after the operation in the lathe has been completed, so as to produce the desired finished surface.

The pitch of the helical surfaces is the same as the pitch of the thread segments on members 70 and 90. In the particular device shown, double threads have been used to provide the desired pitch on the helical surfaces of the finished cutting tool.

Although the device has been described as feeding the work with respect to the cutter, the operation could be reversed by the cutter being mounted in a suitable tool holder mounted in the end of the tubular member 90 and the work piece held in a suitable chuck non-rotatably mounted in the tail stock of a lathe, so as to accomplish the same results, in other words, a mere reversal of parts, resulting in the same relative movement.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A mechanical movement device for use in a stock feeding device for feeding stock with respect to a cutting tool, said mechanical movement device including a stationary member having threads extending throughout a portion of a revolution of the stationary member, said stationary member having a cut-away portion interrupting the threads, a movable member provided with thread segments adapted to threadedly engage the threads of the stationary member, the thread segments on said movable member extending throughout only a portion of a revolution, which portion has a circumferential length less than the circumferential distance across the cut-away portion in the stationary member, and means for retracting the movable member when the threads thereof are located in the cut-away portion of the stationary member.

2. A mechanical device for use in an apparatus for causing a relative movement between a work piece and a cutter so as to cut a helical face upon the end of the work piece, said mechanical movement device including a stationary member provided with thread segments, a cut-away portion in the stationary member interrupting the threads, a rotary member mounted for rotation with respect to the stationary member, means for driving the rotary member, said rotary member having thread segments adapted to engage the thread segments of the stationary member for a portion of a revolution, said rotary member being actuated endwise when the thread segments are in engagement with the thread segments on the stationary member, and means for retracting the rotary member when the thread segments on the rotary member register with the cut-away portion on the stationary member.

3. A mechanical movement device including a stationary member having threads extending throughout a portion of a revolution of the stationary member, said stationary member having a cut-away portion interrupting the threads, a movable member provided with thread segments adapted to threadedly engage the threads of the stationary member, the thread segments of said movable member extending throughout only a portion of a revolution, which portion has a circumferential length less than the circumferential distance across the cut-away portion in the stationary member, and a compression spring for retracting the movable member when the threads are located in the cut-away portion of the stationary member.

RALPH H. LOWE.

REFERENCES CITED

The following references are of record in the file of this patent:

UNITED STATES PATENTS

| Number | Name | Date |
|---|---|---|
| 674,542 | Schulte | May 21, 1901 |
| 697,265 | Mills | Apr. 8, 1902 |
| 1,559,970 | Meahl | Nov. 3, 1925 |
| 1,684,141 | Perkins | Sept. 11, 1928 |
| 1,699,720 | Stone | Jan. 22, 1929 |
| 1,806,562 | Pichler | May 19, 1931 |
| 1,903,280 | Bessom | Apr. 4, 1933 |
| 2,088,379 | Lloyd | July 27, 1937 |
| 2,126,476 | Koong | Aug. 9, 1938 |
| 2,236,327 | Bates | May 25, 1941 |
| 2,385,354 | Gaudreau | Sept. 25, 1945 |